United States Patent
Traczek et al.

(10) Patent No.: US 9,312,524 B2
(45) Date of Patent: Apr. 12, 2016

(54) MOBILE BATTERY MODULES FOR HIGH POWER APPLICATIONS

(75) Inventors: Jeff Traczek, Sandusky, OH (US); Tim Brewster, Lorain, OH (US)

(73) Assignee: R. W. Beckett Corporation, North Ridgeville, OH (US)

( * ) Notice: Subject to any disclaimer, the term of this patent is extended or adjusted under 35 U.S.C. 154(b) by 1146 days.

(21) Appl. No.: 13/237,186

(22) Filed: Sep. 20, 2011

(65) Prior Publication Data

US 2013/0071703 A1    Mar. 21, 2013

(51) Int. Cl.

| | |
|---|---|
| *H01M 2/10* | (2006.01) |
| *H01M 2/12* | (2006.01) |
| *H01M 2/20* | (2006.01) |
| H01M 2/34 | (2006.01) |
| H01M 10/0525 | (2010.01) |
| H01M 10/48 | (2006.01) |
| H01M 10/42 | (2006.01) |
| H01M 10/6552 | (2014.01) |
| H01M 10/6554 | (2014.01) |
| H01M 10/613 | (2014.01) |

(52) U.S. Cl.
CPC .............. *H01M 2/1077* (2013.01); *H01M 2/12* (2013.01); *H01M 2/204* (2013.01); *H01M 2/34* (2013.01); *H01M 10/0525* (2013.01); *H01M 10/482* (2013.01); *H01M 10/488* (2013.01); *H01M 10/613* (2015.04); *H01M 10/6552* (2015.04); *H01M 10/6554* (2015.04); *H01M 2010/4278* (2013.01)

(58) Field of Classification Search
CPC .......... H01M 10/0525; H01M 10/482; H01M 10/488; H01M 10/5004; H01M 10/5048; H01M 10/5053; H01M 2010/4278; H01M 2/1077; H01M 2/12; H01M 2/204; H01M 2/34

USPC ......................................... 429/53, 82, 90, 99
See application file for complete search history.

(56) References Cited

U.S. PATENT DOCUMENTS

| | | | |
|---|---|---|---|
| 5,585,994 A | 12/1996 | Tamai et al. | |
| 5,963,019 A | 10/1999 | Cheon | |
| 5,998,967 A | 12/1999 | Umeki et al. | |
| 6,018,229 A | 1/2000 | Mitchell et al. | |
| 6,261,719 B1* | 7/2001 | Ikeda et al. | 429/211 |
| 6,400,122 B1* | 6/2002 | Iwamura | 320/107 |
| 7,157,881 B1 | 1/2007 | Benchenstein, Jr. et al. | |
| 7,701,169 B2 | 4/2010 | Wang et al. | |
| 8,403,030 B2* | 3/2013 | Payne | 165/80.4 |
| 2002/0156537 A1* | 10/2002 | Sakakibara et al. | 700/1 |
| 2003/0118902 A1* | 6/2003 | Schubert et al. | 429/174 |
| 2004/0170888 A1* | 9/2004 | Cummins et al. | 429/99 |
| 2005/0164081 A1* | 7/2005 | Ogura et al. | 429/185 |
| 2007/0190409 A1* | 8/2007 | Sakurai | 429/159 |
| 2007/0247112 A1 | 10/2007 | Yu et al. | |
| 2011/0106330 A1* | 5/2011 | Lickfelt | 700/297 |

* cited by examiner

*Primary Examiner* — Milton I Cano
*Assistant Examiner* — Ling R Zeng
(74) *Attorney, Agent, or Firm* — Eschweiler & Associates, LLC

(57) ABSTRACT

Some embodiments of the present disclosure relate to a mobile battery module for high power applications. The mobile battery module includes a case having a chamber therein, wherein one or more engagement elements are disposed on an inner surface of the case. A number of blocks removably engage the one or more engagement elements, wherein each block includes a pair of opposing sidewalls. Within each block, a number of end caps extend from the opposing sidewalls to cooperatively hold a number of respective cells there between.

16 Claims, 3 Drawing Sheets

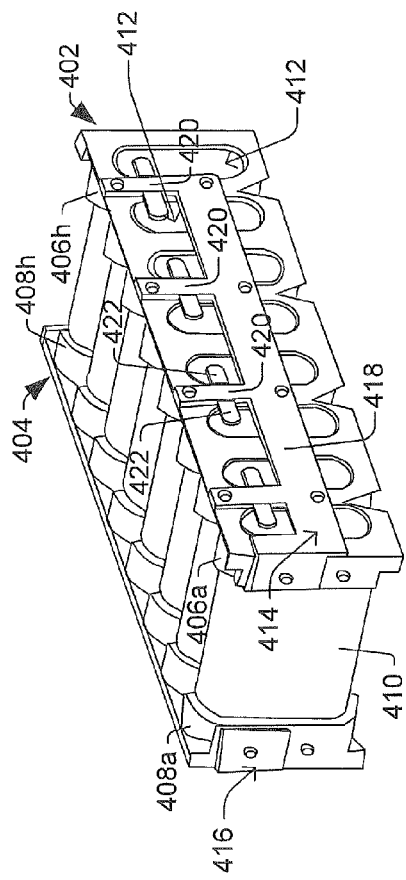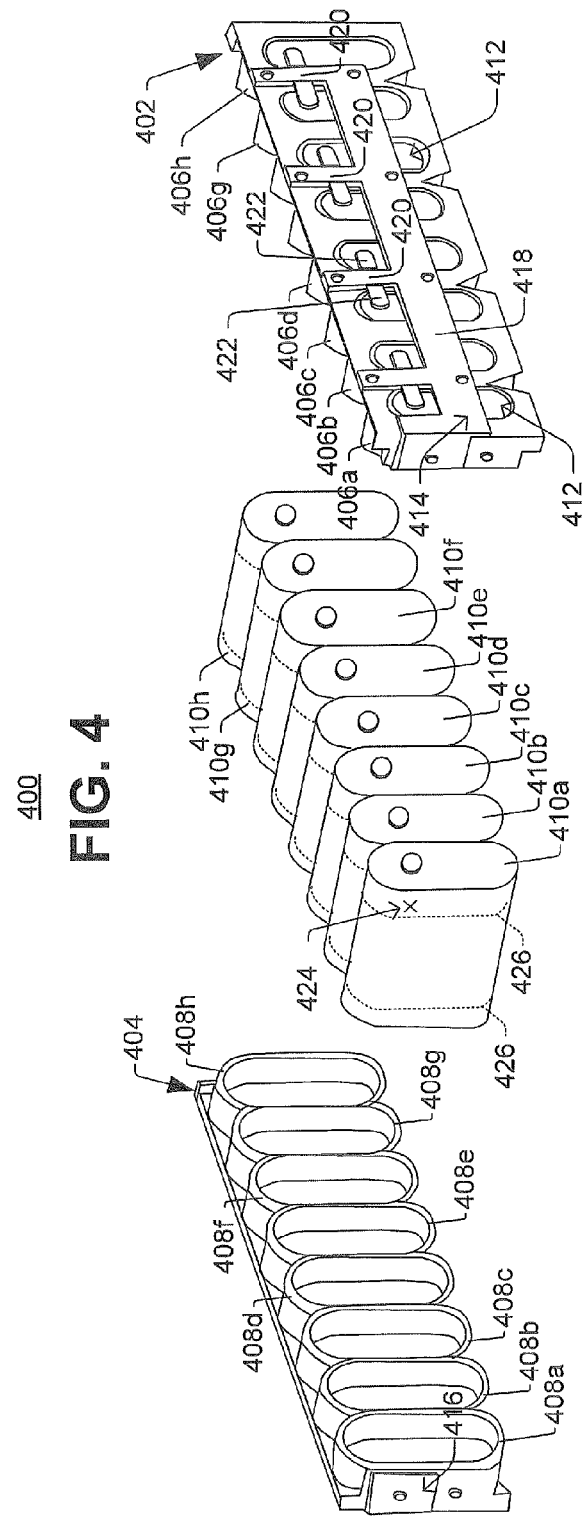

MOBILE BATTERY MODULES FOR HIGH POWER APPLICATIONS

BACKGROUND

Today's consumers are becoming more environmentally conscientious, and as such are turning to alternative energy sources. One alternative energy source is rechargeable batteries, such as lithium ion battery cells for example. Conventionally, such rechargeable cells have been deployed primarily in low power electronic devices (e.g., cameras, cell phones, and audio players).

Unfortunately, conventional rechargeable cells are ill-suited in many regards for high power applications. One reason for this is that individual rechargeable cells typically deliver only a modest amount of power, which is insufficient for high power applications. In addition, if one were to try to assemble a large number of rechargeable cells together to provide a high power signal, any imbalance between the individual batteries' voltages can cause damaging current spikes due to the small internal resistance of the cells. Accordingly, the present disclosure provides improved techniques for mobile battery modules that make use of rechargeable batteries and which are well-suited for high power applications.

DESCRIPTION OF THE DRAWINGS

FIG. 4 is a perspective view of a block in accordance with some embodiments.

FIG. 5 is an exploded perspective view of a block in accordance with some embodiments.

DETAILED DESCRIPTION

Figure 1:
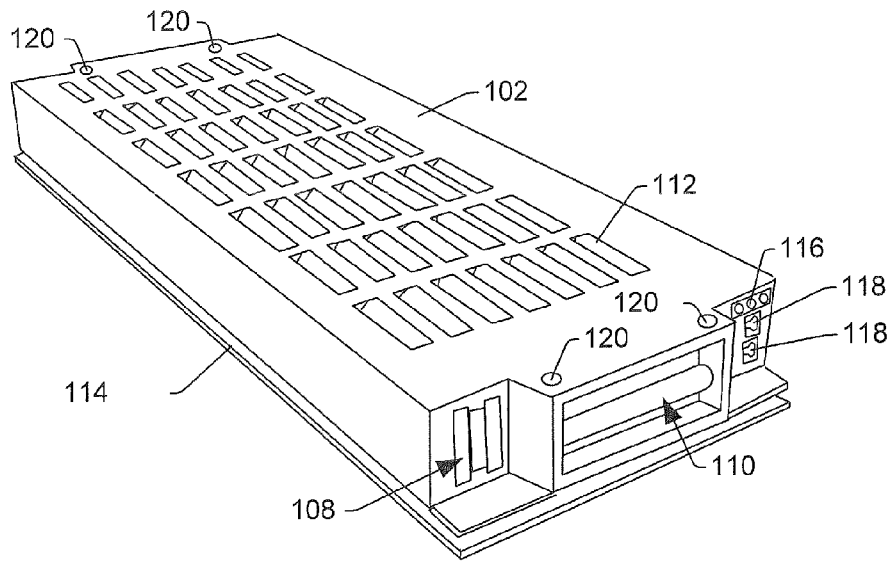
FIG. 1 is a perspective view of a mobile battery module with its case closed in accordance with some embodiments.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details.

Figure 2:
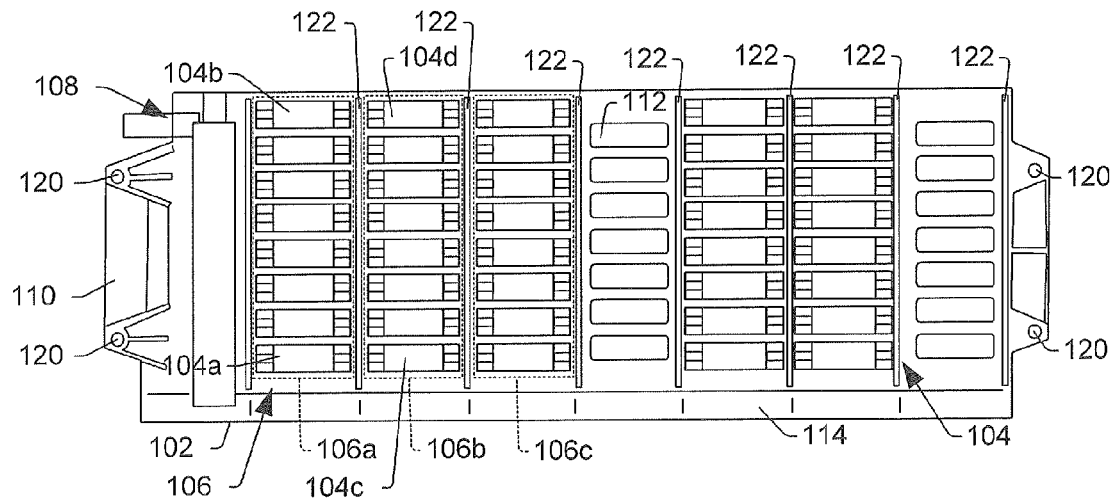
FIG. 2 is a top view of a mobile battery module with its case open in accordance with some embodiments.

FIGS. 1-2 show a mobile battery module in accordance with some aspects of the present invention. In particular, FIG. 1 shows a perspective view of a mobile battery module 100 with its case 102 closed, while FIG. 2 shows a top view of the mobile battery module 100 with its case 102 opened. As can be appreciated, when the cover of the case 102 is closed, the closed case forms an interior chamber which is large enough to house a number of rechargeable batteries or cells 104. Within this interior chamber, the rechargeable cells 104 are arranged in a number of blocks 106. For example, a first block 106a includes cells 104a-104b; while a second block 106b includes cells 104c-104d; and so on. Because the rechargeable cells may be heavy, the case 102 often includes a handle 110 by which a user can easily hold the mobile battery module 100. In many embodiments, the case is a polymer case, although the case could also be made of other materials.

The mobile battery module 100 includes electrical connections to electrically couple the blocks 106 and/or rechargeable cells 104 therein to one another. These electrical connections deliver power to and from the cells 104 via an external port 108. Typically, an integer number, M, of blocks 106 are arranged in series with one another to form the module 100, wherein M is any non-zero, positive integer. In the illustrated example, which is non-limiting, the mobile battery module 100 includes sufficient room to store M=7 blocks 106, although only five blocks are shown as being currently present.

Within a given block 106, an integer number, N, of cells 104 are arranged in parallel, wherein N is any non-zero, positive integer. For example, in FIG. 2's example, each block 106 includes N=8 cells 104 arranged in parallel. Thus, in FIG. 2's example, if each cell 104 has a 5V rating, each block 106 outputs a 5V signal. Due to the parallel arrangement of cells within a block 106, each block 106 can deliver its 5V signal at N=8 times longer than a single cell 104. Further, because the blocks 106 are arranged in series with one another, the battery module 100 can deliver a 25V signal to its exterior port 108 (i.e., five blocks×5 V per block). If all blocks were inserted in FIG. 2, the mobile battery module 100 would be capable of outputting 35V (i.e., seven blocks×5 V per block). It will be appreciated that any number of cells could be arranged in series and/or in parallel within a block (and different packs could include different numbers of cells) and any number of blocks could be strung together in series and/or in parallel to meet a desired output power application.

To help prevent the rechargeable cells from overheating, the case includes at least one temperature regulation vent 112 in a surface thereof. This temperature regulation vent 112 puts the rechargeable cells 104 in thermal connection with the ambient environment (e.g., air or other fluid) external to the case. A conductive rail 114 (e.g., an aluminum rail) is mounted adjacent to a sidewall of the case. This conductive rail 114, in combination with a heat pipe (e.g., a hollow copper tube) extending from proximate to at least one cell in the case to the conductive rail, helps to efficiently carry heat away from the cells. In addition, a graphite heat wrap can surround the cells to help limit temperature increases with respect thereto.

The case 102 can also include several electrical components to help promote safe operation. For example, the case 102 can include a switch (e.g., transistor or simple electromechanical switch) configured to selectively disconnect the exterior port 108 from the cells, thereby limiting danger during shipping or handling of the mobile battery module. The case 102 can also include a visual display 116 (e.g., on the case's outer surface) to provide status information. Among other things, this status information can specify whether cells in the case are in a safe state or an unsafe state; whether the cells need to be charged or are fully charged or are charging; and/or whether an error or fault has occurred with respect to charging or discharging of the cells.

In some embodiments, the case 102 can also include a communication port 118 configured to interface to a network. A network identification number module within the case can transmit a network identification number to another party via the communication port 118, wherein the network identification number uniquely identifies the mobile battery module. Thus, when cells need to be recharged or when a failure or error state arises, the communication port 118 enables the mobile battery module 100 to identify itself to a technician by transmitting its network identification number, and to transmit an error message that notifies the technician of the problem to be rectified.

Figure 3:
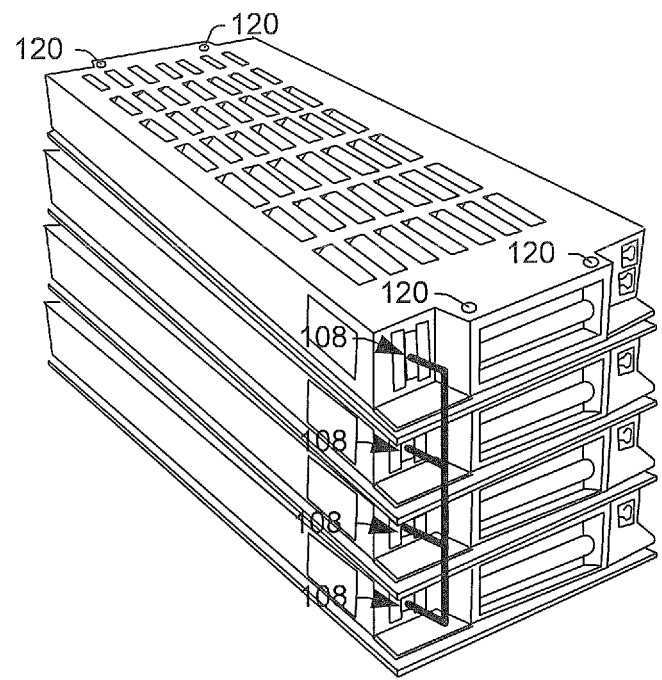
FIG. 3A is a perspective view of a string of mobile battery modules in accordance with some embodiments.
FIG. 3B is a perspective view of a pack that includes two strings of mobile battery modules in accordance with some embodiments.
Figure 3B:
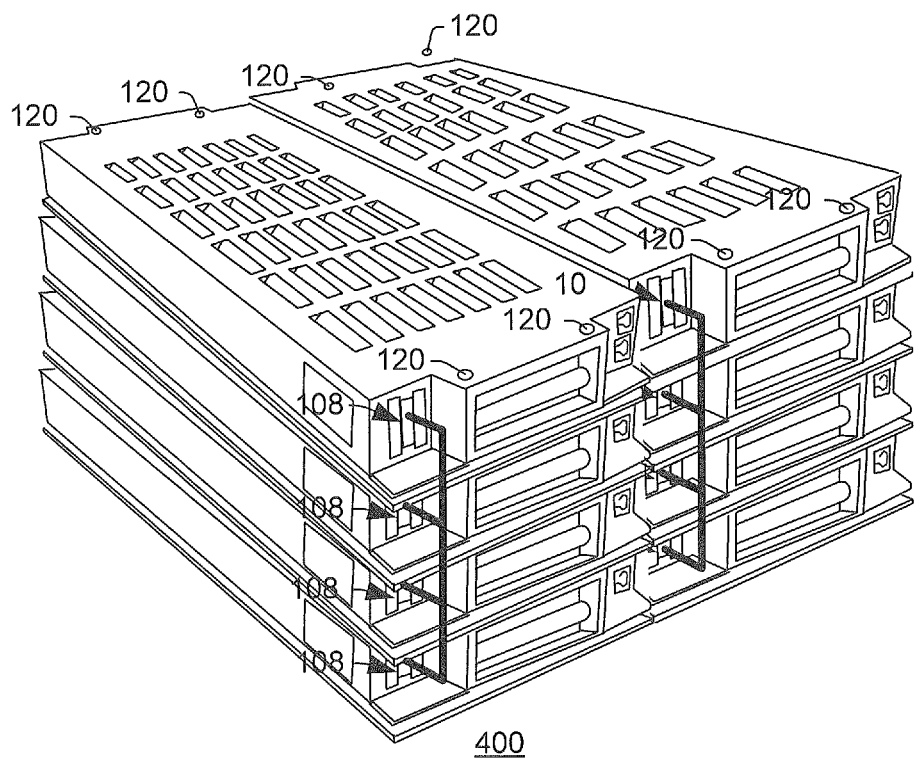

In some embodiments, mobile battery module 100 includes fastening elements (e.g., threaded holes 120 and corresponding bolts). These fastening elements allow multiple mobile battery modules to be securely fastened together in a string configuration 300 such as shown in FIG. 3A. With regards to electrical connections, the individual battery modules 100 can be daisy-chained together at their exterior ports 108 so as to be coupled in series, although they could also be coupled in parallel. As shown in FIG. 3B, multiple strings 300 can be coupled together in parallel to form a battery pack 400, which often has a controller that regulates charging and discharging currents there from. In some cases, spacers (not shown) can be arranged between adjacent mobile battery modules so the temperature regulation vents 112 can keep the cells in fluid communication with the ambient environment. When multiple mobile battery modules are fastened together, their respective exterior ports 108 can be coupled in series or in parallel, such that they can provide even larger power outputs than a single mobile battery module. Because the mobile battery modules 100 are modular, battery modules can be easily replaced or upgraded by technicians. Mobile battery modules can be reconfigured in a vast number of arrangements so as to be well-suited for a wide array of applications. By including such configurations, the present disclosure provides mobile battery modules that are well suited for a wide variety of high power applications.

Turning now to FIGS. 4-5, one can see a block 400 (e.g., block 106a in FIG. 2) in accordance with some embodiments. The block 400 includes a pair of opposing sidewalls 402, 404. The first sidewall 402 includes a number of end caps 406a-406h extending along the length of the sidewall and extending perpendicularly from a surface of the sidewall. Similarly, the second sidewall includes a similar number of end caps 408a-408h extending along the length of the sidewall and extending perpendicularly from a surface of the sidewall. The first and second end caps 406, 408 are arranged to cooperatively hold a number of cells (410a-410h), respectively, there between. The end caps can frictionally engage the cells to hold them in place there between. The sidewall 402, 404 also include apertures 412 that are designed to be aligned with the terminals of the cells when the cells are inserted. Often, the sidewalls are made of plastic, but other materials can also be used.

Conductive rails 414, 416 extend alongside the respective sidewalls. To withstand large currents that may occur in high power applications, the conductive rails 414, 416 may in some embodiments be quite substantial. To strike a good balance between performance and material cost, the rails may have a branch structure to correspond to the currents expected to flow though the rails. Thus, each conductive rail can include a relatively thick trunk 418 and several thinner branches 420. Conductive tabs 422 extend from the branches so as to connect to the terminals of the cells. In one embodiment, the conductive rails can be made of copper having a thickness of about 0.03 inches, and the trunks 418 can have a width of about 0.50 inches while the branches 420 can have widths of about 0.38 inches.

The surface geometry of the end caps are often structured to receive a number of different types of batteries. For example, in many embodiments, each pair of corresponding end caps (e.g., 406a, 408a) can receive either a single prismatic battery or a pair of 18650 batteries. An 18650 battery typically has a diameter of approximately 18 mm and a height of approximately 65 mm; while a prismatic battery has about the same height as an 18650 battery and an approximate diameter/width that is about twice that of an 18650 battery.

In some embodiments, the cells can each include at least one pressure relief vent 424 in a cover thereof (see FIG. 5). If present, this pressure relief vent 424 selectively vents pressure from a cell to limit pressure build-up and help reduce overheating in the cell. To prevent hot, vented air from "cascading" from one cell to the next (which could potentially cause cascaded overheating of the cells), the end caps can have sufficient height so as to extend over the pressure relief vents (as indicated by the dashed lines 426). Thus, the end caps can deflect hot, vented air from an overheated cell away from an adjacent cell to help prevent cascaded overheating of cells.

To secure a block 400 in a mobile battery module 100, the mobile battery module typically includes an engagement element on an inner surface thereof. For example, FIG. 2 shows a rib 122 extending from the inner surface of the case between adjacent blocks. The rib 122 extends into the inner cavity of the mobile battery module such that adjacent sidewalls of adjacent blocks simultaneously engage the rib. Thus, the rib 122 helps a user to easily align blocks 106 in the inner cavity of the mobile block 100, thereby helping to ensure good electrical connections when the blocks are inserted. Engagement elements can take other forms in other embodiments. For example, other engagement elements can comprise one or more posts which serve as guides for the blocks, or can comprise threaded holes in the blocks and corresponding threaded holes in the case, wherein screws or other fasteners secure the blocks in the case at pre-determined locations. In still other embodiments, an engagement element can comprise a tab extending from the block and which engages a recess in the case. Other arrangements also fall within the scope of the present disclosure.

Although the disclosure has been shown and described with respect to one or more implementations, equivalent alterations and modifications will occur to others skilled in the art based upon a reading and understanding of this specification and the annexed drawings. For example, it will be appreciated that identifiers such as "first" and "second" do not imply any type of ordering or placement with respect to other elements; but rather "first" and "second" and other similar identifiers are just generic identifiers. In addition, it will be appreciated that the term "coupled" includes direct and indirect coupling. Also, although the disclosure above has mentioned lithium ion cells as one type of rechargeable cell, it will be appreciated that other types of rechargeable cells can also be included. For example, rechargeable cells can also include rechargeable alkaline, lead acid, nickel-cadmium, nickel metal hydride, lithium-ion polymer, NiH2, NiMH, Ni Zinc, and lithium-titanate, among others. The disclosure includes all such modifications and alterations and is limited only by the scope of the following claims. In particular regard to the various functions performed by the above described components (e.g., elements and/or resources), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. In addition, the articles "a" and "an" as used in this application and the appended claims are to be construed to mean "one or more".

Furthermore, to the extent that the terms "includes", "having", "has", "with", or variants thereof are used in either the detailed description or the claims, such terms are intended to be inclusive in a manner similar to the term "comprising."

What is claimed is:

1. A mobile battery module comprising:
   a case having a chamber therein, wherein an engagement element is disposed on an inner surface of the case;
   a removable first block that engages the engagement element and which includes a first pair of opposing sidewalls, wherein a first end cap extends from one of the first pair of opposing sidewalls and a second end cap extends from the other of the first pair of opposing sidewalls towards the first end cap such that the first and second end caps are arranged to cooperatively hold a first battery there between;
   a removable second block that engages the engagement element and which includes a second pair of opposing sidewalls, wherein a third end cap extends from one of the second pair of opposing sidewalls and a fourth end cap extends from the other of the second pair of opposing sidewalls towards the third end cap such that the third and fourth end caps are arranged to cooperatively hold a second battery there between;
   wherein the first battery extends along an axis that intersects first and second battery ends of the first battery and has a battery sidewall extending continuously between the first and second battery ends, wherein a battery terminal is disposed on at least one of the first or second battery ends and at least one pressure relief vent is disposed on the battery sidewall to selectively vent pressure from the first battery, and
   wherein at least one of the first or second end caps extends from its sidewall by a distance sufficient to extend beyond the at least one pressure relief vent.

2. The mobile battery module of claim 1, wherein the engagement element comprises a rib, post, hole, or tab that facilitates engagement between the first and second removable blocks and the inner surface of the case.

3. The mobile battery module of claim 1, wherein the first removable block includes not only the first end cap, but rather a plurality of first end caps extending from the one sidewall; and includes not only the second end cap, but rather a plurality of second end caps extending from the other sidewall towards the plurality of first end caps, respectively; wherein the plurality of first and second end caps are arranged to cooperatively hold a plurality of batteries, respectively, there between.

4. The mobile battery module of claim 1, wherein the case further comprises at least one temperature regulation vent therein to allow air or other ambient fluid to thermally couple the first and second batteries to the ambient environment external to the case.

5. The mobile battery module of claim 1, wherein the first and second batteries are lithium ion batteries.

6. The mobile battery module of claim 1, further comprising:
   a handle immovably integrated into an exterior sidewall of the case to hold the mobile battery module.

7. The mobile battery module of claim 1, further comprising:
   a conductive rail mounted adjacent to a sidewall of the case.

8. The mobile battery module of claim 7, wherein the conductive rail comprises:
   a trunk region;
   one or more branch regions branching from the trunk, wherein a branch region has a smaller cross sectional area than that of the trunk region; and
   one or more tabs extending from the one or more branch regions so as to contact terminals of one or more batteries, respectively.

9. The mobile battery module of claim 7, further comprising:
   a thermally conductive rail extending along a sidewall or bottom surface of the case and configured to carry heat generated by batteries in the case away from the case.

10. The mobile battery module of claim 1, further comprising:
    a graphite heat wrap surrounding at least one of the first battery or second battery to limit temperature increases with respect thereto.

11. The mobile battery module of claim 1, further comprising:
    an exterior port coupled to the first and second batteries; and
    a switch configured to disconnect the exterior port from the first and second batteries, thereby limiting danger during shipping or handling of the mobile battery module.

12. The mobile battery module of claim 1, further comprising:
    a display on the case to provide status information with regards to whether batteries in the first and second blocks are in a safe state or an unsafe state or whether an error or fault has occurred with respect to charging or discharging of the batteries.

13. The mobile battery module of claim 1, further comprising:
    a communication port configured to interface to a network.

14. The mobile battery module of claim 13, further comprising:
    a network identification number module to transmit a network identification number to another party on the network via the communication port, wherein the network identification number uniquely identifies the mobile battery module.

15. The mobile battery module of claim 13, further comprising:
    a diagnostic module to monitor for an error or fault state of the first and second batteries and to transmit a diagnostic message indicating the error or fault state over the network via the communication port.

16. The mobile battery module of claim 1, wherein the first and second batteries each have a cylindrical or elongated shape and the first and second ends of the first battery are circular or oval-like in shape.

* * * * *